(12) United States Patent
Wang et al.

(10) Patent No.: US 10,007,303 B1
(45) Date of Patent: Jun. 26, 2018

(54) ELECTRONIC EQUIPMENT CAPABLE OF SWITCHING OUTPUT INTERFACES

(71) Applicant: Quanta Computer Inc., Taoyuan (TW)

(72) Inventors: Jui-Lung Wang, Taoyuan (TW); Chang-Ta Miao, Taoyuan (TW); Chu-Fu Wang, Taoyuan (TW); Gwo-Chyuan Chen, Taoyuan (TW)

(73) Assignee: QUANTA COMPUTER INC., Guishan Dist., Taoyuan (TW)

( * ) Notice: Subject to any disclaimer, the term of this patent is extended or adjusted under 35 U.S.C. 154(b) by 0 days. days.

(21) Appl. No.: 15/587,565

(22) Filed: May 5, 2017

(30) Foreign Application Priority Data

Dec. 28, 2016 (TW) .............................. 105219811 U

(51) Int. Cl.
 *A63F 9/00* (2006.01)
 *G06F 1/16* (2006.01)
 *A45F 5/00* (2006.01)
 *A45F 3/14* (2006.01)
 *A63F 13/25* (2014.01)
 *A63F 13/92* (2014.01)
 *H02J 7/00* (2006.01)

(52) U.S. Cl.
 CPC .............. *G06F 1/1683* (2013.01); *A45F 3/14* (2013.01); *A45F 5/00* (2013.01); *A63F 13/25* (2014.09); *A63F 13/92* (2014.09); *G06F 1/163* (2013.01); *G06F 1/1635* (2013.01); *G06F 1/1637* (2013.01); *G06F 1/1679* (2013.01); *H02J 7/0013* (2013.01); *H02J 7/0045* (2013.01); *A45F 2003/146* (2013.01)

(58) Field of Classification Search
 None
 See application file for complete search history.

(56) References Cited

U.S. PATENT DOCUMENTS

| 5,398,276 | A  | * | 3/1995  | Lemke     | H04W 24/00  |
|           |    |   |         |           | 356/4.01    |
| 6,659,319 | B2 | * | 12/2003 | Purpura   | A45C 9/00   |
|           |    |   |         |           | 224/270     |
| 7,978,464 | B2 | * | 7/2011  | Daley, III| G06F 1/1628 |
|           |    |   |         |           | 361/679.02  |
| 8,553,401 | B2 | * | 10/2013 | Daley, III| G06F 1/1628 |
|           |    |   |         |           | 206/320     |
| 8,605,415 | B2 | * | 12/2013 | Daley, III| G06F 1/163  |
|           |    |   |         |           | 361/679.03  |
| 8,830,666 | B2 | * | 9/2014  | Daley, III| A45C 11/00  |
|           |    |   |         |           | 361/679.03  |

(Continued)

*Primary Examiner* — Seng H Lim
(74) *Attorney, Agent, or Firm* — McClure, Qualey & Rodack, LLP

(57) ABSTRACT

An electronic equipment capable of switching output interfaces is provided. The electronic equipment includes a display device, a backpack electric device, and a host. The display device includes a first connection member and a display. The first connection member pivots on the display. The backpack electric device includes a second connection member, a base, and a strap. The strap is disposed on the base. The second connection member is disposed on the base. The host is selectively connected to the display device and the backpack electric device. The host includes a connection slot, a first data transmission port, and a power transmission port. The first data transmission port and the power transmission port are disposed in the connection slot.

10 Claims, 7 Drawing Sheets

(56) References Cited

U.S. PATENT DOCUMENTS

| | | | | |
|---|---|---|---|---|
| 9,411,371 B1* | 8/2016 | Goren | ................... | G06F 1/3265 |
| 2003/0038149 A1* | 2/2003 | Purpura | ................... | A45C 9/00 |
| | | | | 224/275 |
| 2006/0113203 A1* | 6/2006 | Daley | ................... | A45C 5/02 |
| | | | | 206/320 |
| 2007/0051766 A1* | 3/2007 | Spencer | ................ | A45C 11/00 |
| | | | | 224/607 |
| 2007/0164987 A1* | 7/2007 | Graham | ................... | A45F 5/00 |
| | | | | 345/156 |
| 2010/0122995 A1* | 5/2010 | Thomas | ................ | A45C 11/00 |
| | | | | 224/681 |
| 2011/0204843 A1* | 8/2011 | Foster | ................... | A45C 11/00 |
| | | | | 320/101 |
| 2013/0033803 A1* | 2/2013 | Evans | ..................... | A45F 3/14 |
| | | | | 361/679.01 |
| 2014/0085814 A1* | 3/2014 | Kielland | ................... | A45F 3/02 |
| | | | | 361/679.55 |
| 2015/0137731 A1* | 5/2015 | Kim | ....................... | H02J 7/355 |
| | | | | 320/101 |
| 2015/0205327 A1* | 7/2015 | Daley, III | .............. | G06F 1/1698 |
| | | | | 361/679.03 |
| 2016/0147254 A1* | 5/2016 | Daley, III | ............... | G06F 1/163 |
| | | | | 348/725 |
| 2016/0174674 A1* | 6/2016 | Oberpriller | ............. | A45F 5/021 |
| | | | | 224/222 |
| 2016/0357324 A1* | 12/2016 | Smith | ................... | G06F 3/0416 |

* cited by examiner

ELECTRONIC EQUIPMENT CAPABLE OF SWITCHING OUTPUT INTERFACES

CROSS REFERENCE TO RELATED APPLICATIONS

This Application claims priority of Taiwan Patent Application No. 105219811, filed on Dec. 28, 2016, the entirety of which is incorporated by reference herein.

BACKGROUND OF THE INVENTION

Field of the Invention

The present invention relates to electronic equipment capable of switching output interfaces, and in particular to electronic equipment having a backpack electric device.

Description of the Related Art

Conventional virtual reality equipment includes a host, a virtual reality display, and a joystick. The virtual reality display and the joystick are coupled to the host by cables. The host is disposed on the ground or a table. During gameplay, since the player performs substantial actions, the cables can easily be pulled or cause the player to stumble. Additionally, the virtual reality equipment can only be utilized to play games.

BRIEF SUMMARY OF THE INVENTION

In one embodiment, electronic equipment capable of switching output interfaces is provided. The electronic equipment includes a display device, a backpack electric device, and a host. The display device includes a first connection member and a display. The first connection member pivots on the display. The backpack electric device includes a second connection member, a base, and a strap. The strap is disposed on the base. The second connection member is disposed on the base. The host is selectively connected to the display device and the backpack electric device. The host comprises a connection slot, a first data transmission port, and a power transmission port. The first data transmission port and the power transmission port are disposed in the connection slot. In a first state, the first connection member is connected to the connection slot, and the first data transmission port is coupled to the display. In a second state, the second connection member is connected to the connection slot, and the electric transmission port is coupled to the base.

In one embodiment, the electronic equipment further comprises a virtual reality device. The host further comprises a second data transmission port. In the second state, the virtual reality device is coupled to the second data transmission port.

In one embodiment, the first connection member comprises a first connection head. The first connection head is adapted to be inserted into the first data transmission port to transmit an image signal.

In one embodiment, the first connection member further comprises at least one first elastic hook and a first lever. The first lever is adapted to be moved between a first position and a second position. In the first state, the first elastic hook is buckled to the bottom of the connection slot. When the first lever is moved from the first position to the second position, the first elastic hook is released, and the first connection member is separated from the connection slot.

In one embodiment, the second connection member comprises a second connection head. The second connection head is adapted to be inserted into the electric transmission port to transmit electricity.

In one embodiment, the second connection member further comprises at least one second elastic hook and a second lever. The second lever is adapted to be moved between a third position and a fourth position. In the second state, the second elastic hook is buckled to the bottom of the connection slot. When the second lever is moved from the third position to the fourth position, the second elastic hook is released, and the second connection member is separated from the connection slot.

In one embodiment, the backpack electric device further comprises a holding unit. The second connection member is disposed on a side of the base. The holding unit is disposed on the opposite side of the base. The host comprises an abutting portion. The connection slot is disposed on a side of the host. The abutting portion is disposed on the opposite side of the host. In the second state, the second connection member is connected to the connection slot, and the holding unit hooks onto the abutting portion.

In one embodiment, the backpack electric device further comprises a first backpack battery and the second backpack battery. The base comprises a first battery slot and a second battery slot. The first backpack battery is disposed in the first battery slot. The second backpack battery is disposed in the second battery slot. The host comprises a host battery, and the host battery is disposed in the host.

In one embodiment, the base further comprises a first power lamp and a second power lamp. The first power lamp shows the power level of the first backpack battery. The second power lamp shows the power level of the second backpack battery.

In one embodiment, the base further comprises a charging unit and an alternating current port. The alternating current port is adapted to be coupled to an alternating current source. The charging unit is coupled to the alternating current port, the first backpack battery, and the second backpack battery to charge the first backpack battery and the second backpack battery.

Utilizing the electronic equipment of the embodiment of the invention, the host is combined with the backpack electric device and the virtual reality device in the second state, and the user therefore shoulders the host while playing video games. Although the virtual reality device is connected to the second data transmission port by the cable, the cable is short, and the cable will not be pulled or cause the user to stumble. Additionally, the host can be combined with the display device to serve as a notebook computer in the first state, and the functionality and practicality of the host are improved.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
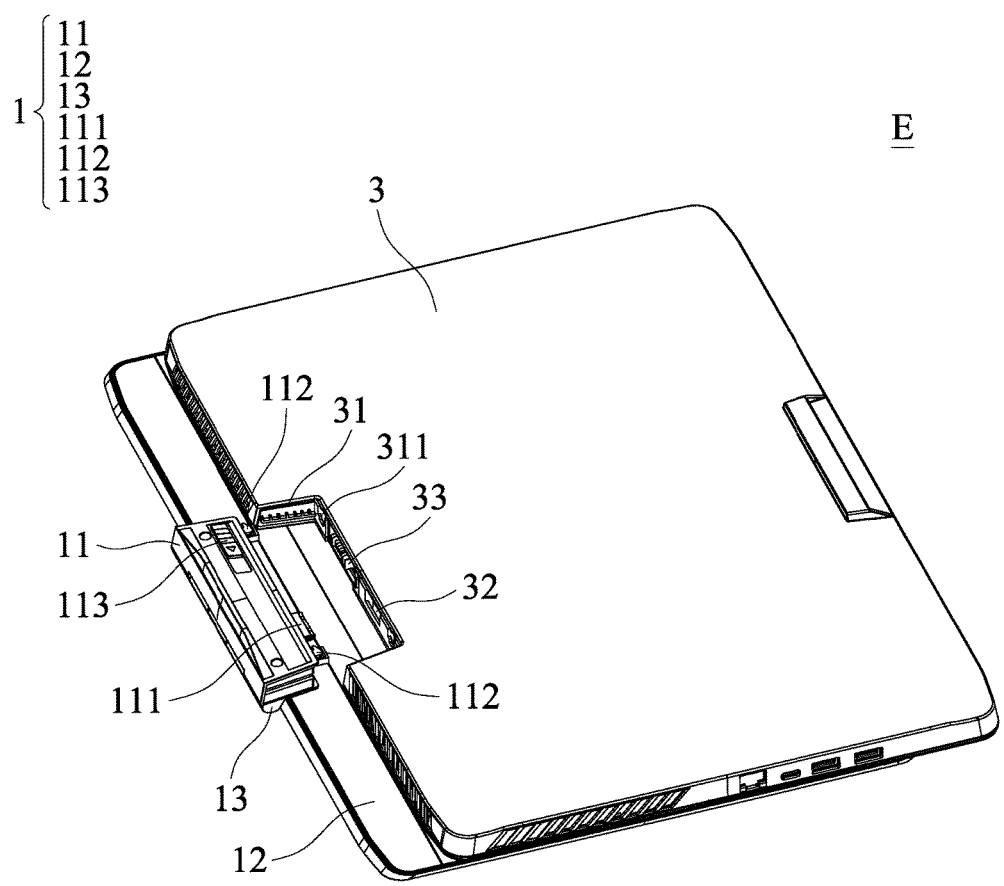
FIG. 1 shows the electronic equipment capable of switching output interfaces of the embodiment of the invention, wherein the electronic equipment is in the first state.
Figure 2A:
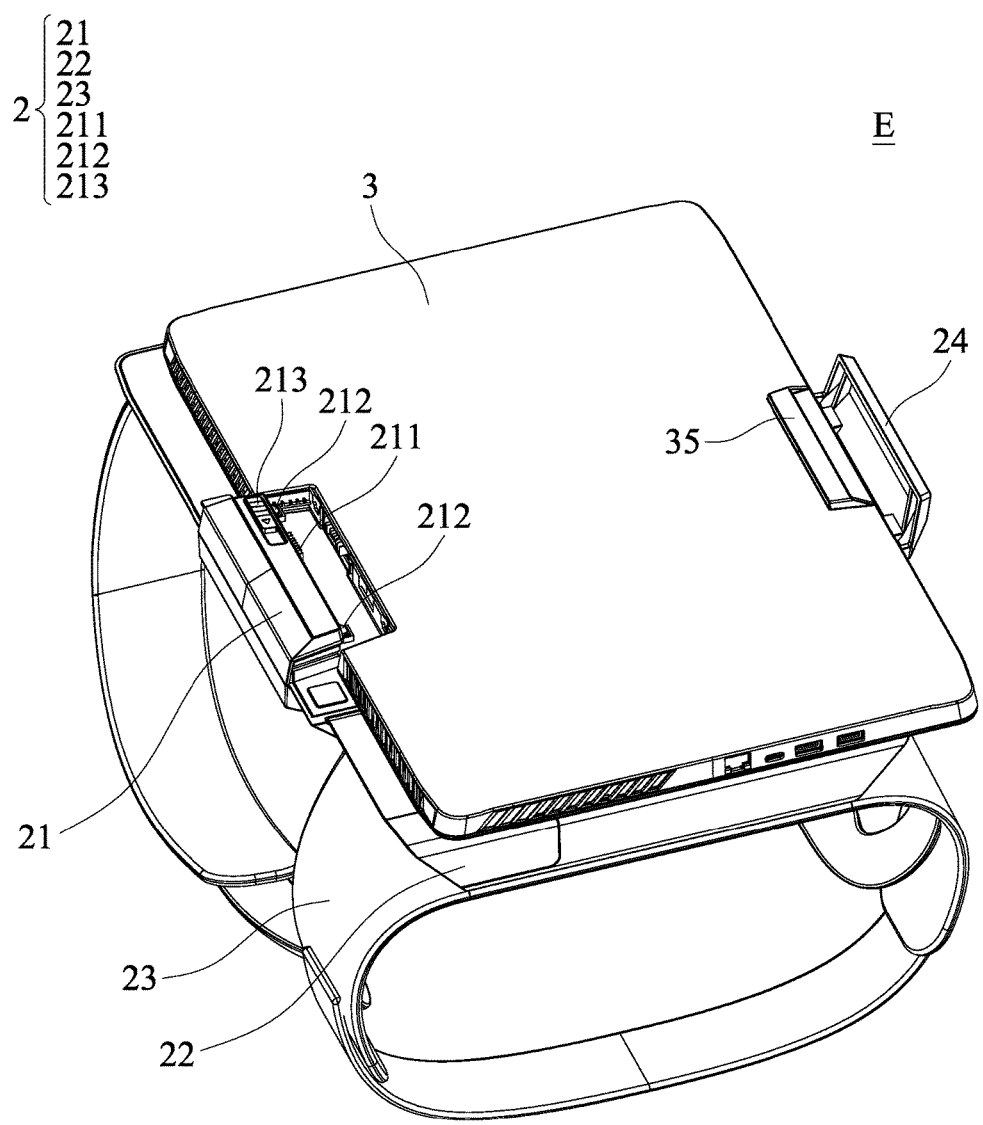
FIG. 2A shows the electronic equipment capable of switching output interfaces of the embodiment of the invention, wherein the electronic equipment is in the second state.
Figure 2B:
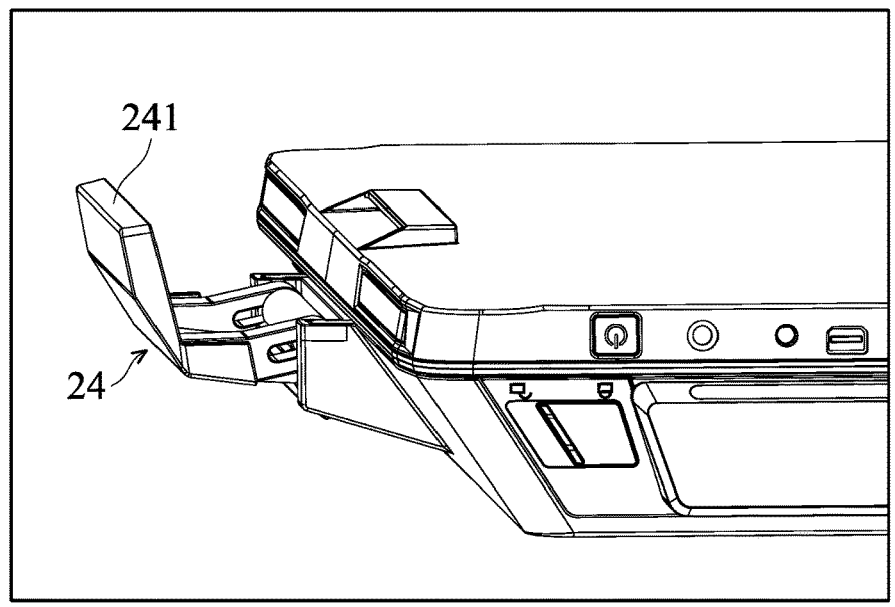
FIGS. 2B, 2C, 2D, 2E and 2F show the steps of the holding unit hooking onto the abutting portion in the second state.
Figure 2C:
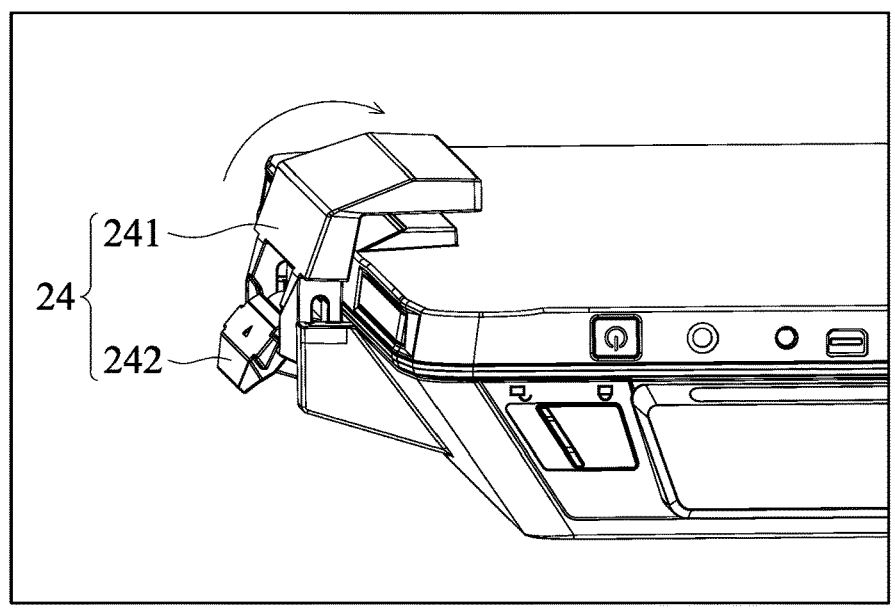
Figure 2D:
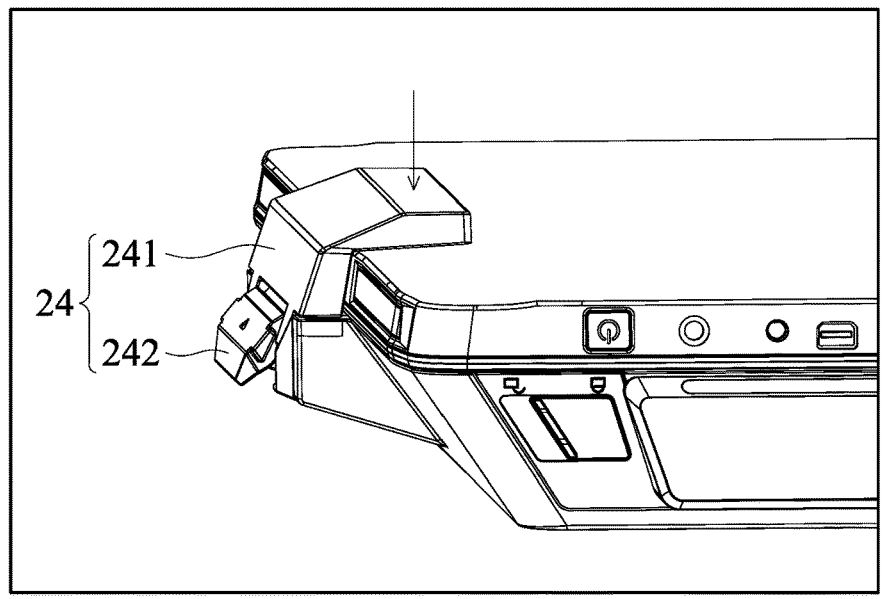
Figure 2E:
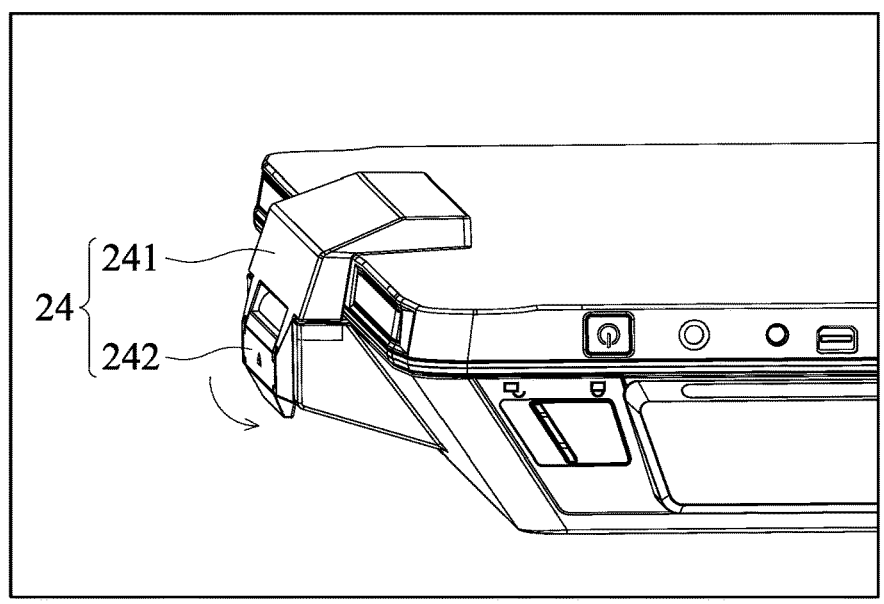
Figure 2F:
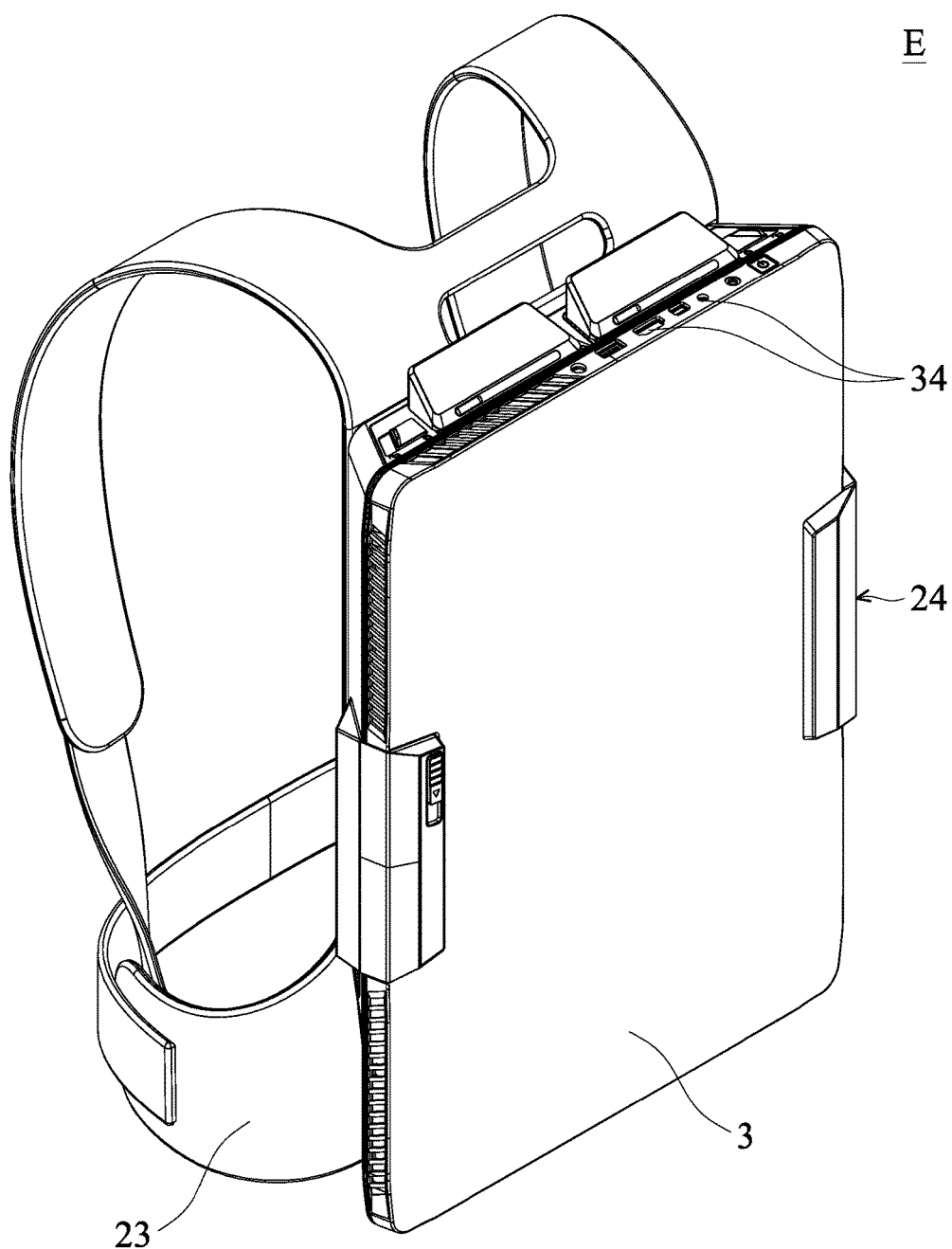

FIGS. 1, 2A and 2F show the electronic equipment E capable of switching output interfaces of the embodiment of the invention. The electronic equipment E includes a display device 1, a backpack electric device 2, and a host 3. The display device 1 includes a first connection member 11 and a display 12. The first connection member 11 pivots on the display 12 by a hinge 13. The backpack electric device 2 includes a second connection member 21, a base 22, and a strap 23. The strap 23 is disposed on the base 22. The second connection member 21 is disposed on the base 22. The host 3 is selectively connected to the display device 1 (as shown in FIG. 1) and the backpack electric device 2 (as shown in FIGS. 2A and 2F). The host 3 comprises a connection slot 31, a first data transmission port 32, and a power transmission port 33. The first data transmission port 32 and the power transmission port 33 are disposed in the connection slot 31.

With reference to FIG. 1, in a first state, the first connection member 11 is connected to the connection slot 31, and the first data transmission port 32 is coupled to the display 12. The host 3 provides an image signal to the display 12. In one embodiment, the display 12 is a liquid-crystal display. The host 3 is combined with the display device 1 to serve as a notebook computer.

Figure 3:
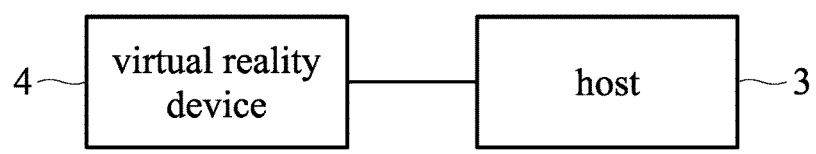
FIG. 3 is a block diagram of the electronic equipment of the embodiment of the invention, wherein the host is connected to the virtual reality device.

With reference to FIGS. 2A and 2F, in a second state, the second connection member 21 is connected to the connection slot 31, and the electric transmission port 33 is coupled to the base 22. With reference to FIGS. 2F and 3, in one embodiment, the electronic equipment E further comprises a virtual reality device 4. The host 3 further comprises a second data transmission port 34. In the second state, the virtual reality device 4 is coupled to the second data transmission port 34. The host 3 provides the image signal to the virtual reality device 4. The virtual reality device 4 can be a pair of virtual reality glasses. In one embodiment, the virtual reality device 4 is connected to the second data transmission port 34 by a cable.

Utilizing the electronic equipment of the embodiment of the invention, the host 3 is combined with the backpack electric device 2 and the virtual reality device 4 in the second state, and the user therefore shoulders the host 3 while playing video games. Although the virtual reality device 4 is connected to the second data transmission port by the cable 34, the cable 34 is short, and the cable 34 will not be pulled or cause the user to stumble. Additionally, the host 3 can be combined with the display device 1 to serve as a notebook computer while in the first state, and the functionality and practicality of the host 3 are improved.

With reference to FIG. 1, in one embodiment, the first connection member 11 comprises a first connection head 111. The first connection head 111 is adapted to be inserted into the first data transmission port 32 to transmit the image signal. In one embodiment, the first connection member 11 further comprises at least one first elastic hook 112 and a first lever 113. The first lever 113 is adapted to be moved between a first position and a second position. In the first state, the first elastic hook 112 is buckled to a wedging portion 311 on the bottom of the connection slot 31. When the first lever 113 is moved from the first position to the second position, the first elastic hook 112 is released, and the first connection member 11 is separated from the connection slot 31.

With reference to FIG. 2A, in one embodiment, the second connection member 21 comprises a second connection head 211. The second connection head 211 is adapted to be inserted into the electric transmission port 33 to transmit electricity. In one embodiment, the second connection member 21 further comprises at least one second elastic hook 212 and a second lever 213. The second lever 213 is adapted to be moved between a third position and a fourth position. In the second state, the second elastic hook 212 is buckled to the wedging portion 311 on the bottom of the connection slot 31. When the second lever 213 is moved from the third position to the fourth position, the second elastic hook 212 is released, and the second connection member 21 is separated from the connection slot 31.

With reference to FIGS. 2A~2F, in one embodiment, the backpack electric device further comprises a holding unit 24. The second connection member 21 is disposed on a side of the base 22. The holding unit 24 is disposed on the opposite side of the base 22. The host 3 comprises an abutting portion 35. The connection slot 31 is disposed on a side of the host 3. The abutting portion 35 is disposed on the opposite side of the host 3. In the second state, the second connection member 21 is connected to the connection slot 31, and the holding unit 24 hooks onto the abutting portion 35. In details, the holding unit 24 comprises a holding portion 241 and a rod 242. The holding portion 241 is rotated between a first orientation and a second orientation to hold or release the abutting portion 35. When the holding portion 241 holds the abutting portion 35, the rod 242 is moved from a fifth orientation to a sixth orientation to restrict the orientation of the holding portion 241.

Figure 4A:
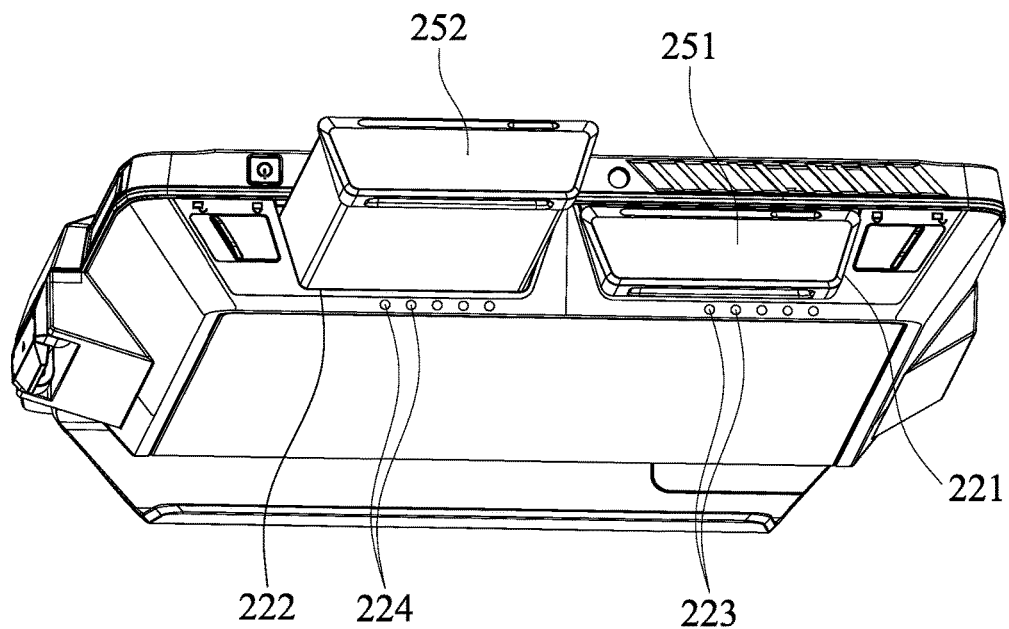
FIG. 4A shows the first backpack battery and the second backpack battery of the embodiment of the invention.
Figure 4B:
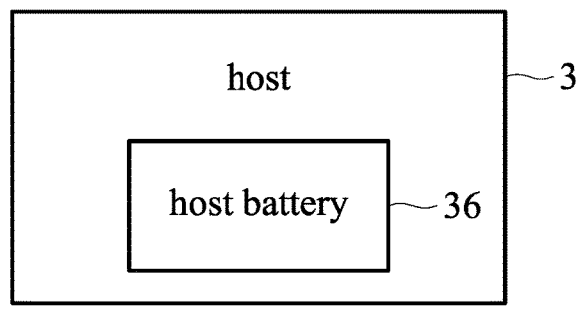
FIG. 4B is a block diagram of the host of the embodiment of the invention.
Figure 4C:
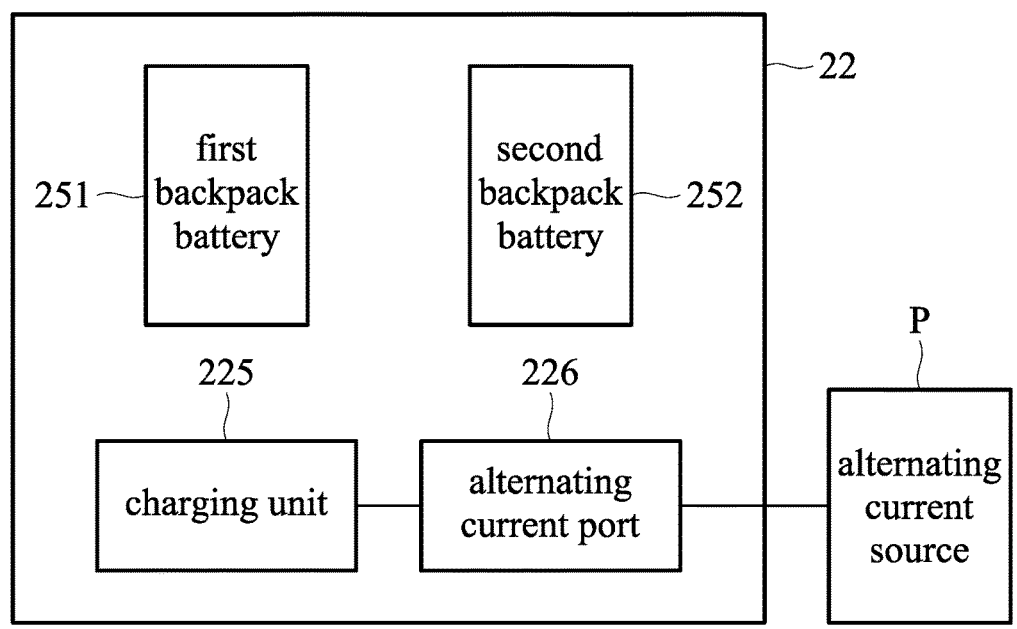
FIG. 4C is a block diagram of the base of the embodiment of the invention.

With reference to FIGS. 4A and 4B, in one embodiment, the backpack electric device 2 further comprises a first backpack battery 251 and a second backpack battery 252. The base 22 comprises a first battery slot 221 and a second battery slot 222. The first backpack battery 251 is disposed in the first battery slot 221. The second backpack battery 252 is disposed in the second battery slot 222. The host 3 comprises a host battery 36 (FIG. 4B), and the host battery 36 is disposed in the host 3. In an operation state, the first backpack battery 251 and the second backpack battery 252 provide electricity to the host 3. In a replacement state, the host battery 36 and one of the backpack batteries provide electricity to the host 3, and the user can replace the other backpack battery. For example, when the first backpack battery 251 is out of power, the second backpack battery 252 and the host battery 36 can provide electricity to the host 3, and the first backpack battery 251 can be replaced by the user.

In one embodiment, the base 22 further comprises a first power lamp 223 and a second power lamp 224. The first power lamp 223 shows the power level of the first backpack battery 251. The second power lamp 224 shows the power level of the second backpack battery 252.

In one embodiment, the base 22 further comprises a charging unit 225 and an alternating current port 226. The alternating current port 226 is adapted to be coupled to an alternating current source P. The charging unit 225 is coupled to the alternating current port 226, the first backpack battery 251, and the second backpack battery 252 to charge the first backpack battery 251 and the second backpack battery 252.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electronic equipment capable of switching output interfaces, comprising:
   a display device, comprising a first connection member and a display, wherein the first connection member pivots on the display;
   a backpack electric device, comprising a second connection member, a base, and a strap, wherein the strap is disposed on the base, and the second connection member is disposed on the base; and
   a host, selectively connected to the display device and the backpack electric device, wherein the host comprises a connection slot, a first data transmission port, and a power transmission port, the first data transmission port and the power transmission port are disposed in the connection slot, in a first state, the first connection member is connected to the connection slot and the first data transmission port is coupled to the display, and in a second state, the second connection member is connected to the connection slot and the electric transmission port is coupled to the base.

2. The electronic equipment as claimed in claim 1, further comprising a virtual reality device, wherein the host further comprises a second data transmission port, and in the second state, the virtual reality device is coupled to the second data transmission port.

3. The electronic equipment as claimed in claim 2, wherein the first connection member comprises a first connection head, the first connection head is adapted to be inserted into the first data transmission port to transmit an image signal.

4. The electronic equipment as claimed in claim 3, wherein the first connection member further comprises at least one first elastic hook and a first lever, the first lever is adapted to be moved between a first position and a second position, in the first state, the first elastic hook is buckled to a bottom of the connection slot, and when the first lever is moved from the first position to the second position, the first elastic hook is released, and the first connection member is separated from the connection slot.

5. The electronic equipment as claimed in claim 2, wherein the second connection member comprises a second connection head, and the second connection head is adapted to be inserted into the electric transmission port to transmit electricity.

6. The electronic equipment as claimed in claim 5, wherein the second connection member further comprises at least one second elastic hook and a second lever, wherein the second lever is adapted to be moved between a third position and a fourth position, in the second state, the second elastic hook is buckled to the bottom of the connection slot, and when the second lever is moved from the third position to the fourth position, the second elastic hook is released, and the second connection member is separated from the connection slot.

7. The electronic equipment as claimed in claim 6, wherein the backpack electric device further comprises a holding unit, the second connection member is disposed on a side of the base, and the holding unit is disposed on an opposite side of the base, the host comprises an abutting portion, the connection slot is disposed on a side of the host, the abutting portion is disposed on an opposite side of the host, and in the second state, the second connection member is connected to the connection slot, and the holding unit hooks onto the abutting portion.

8. The electronic equipment as claimed in claim 2, wherein the backpack electric device further comprises a first backpack battery and the second backpack battery, the base comprises a first battery slot and a second battery slot, the first backpack battery is disposed in the first battery slot, the second backpack battery is disposed in the second battery slot, the host comprises a host battery, and the host battery is disposed in the host.

9. The electronic equipment as claimed in claim 8, wherein the base further comprises a first power lamp and a second power lamp, the first power lamp shows a power level of the first backpack battery, and the second power lamp shows a power level of the second backpack battery.

10. The electronic equipment as claimed in claim 9, wherein the base further comprises a charging unit and an alternating current port, the alternating current port is adapted to be coupled to an alternating current source, and the charging unit is coupled to the alternating current port, the first backpack battery, and the second backpack battery to charge the first backpack battery and the second backpack battery.

* * * * *